(12) United States Patent
Bird (10) Patent No.: US 9,791,077 B2
(45) Date of Patent: Oct. 17, 2017

(54) PIPE COUPLING HAVING DOUBLE-THREADED TIGHTENING FASTENER AND ASSOCIATED METHODS

(71) Applicant: Sensus Spectrum LLC, Raleigh, NC (US)

(72) Inventor: Edwin A. Bird, Ashdown, AR (US)

(73) Assignee: Sensus Spectrum LLC, Raleigh, NC (US)

( * ) Notice: Subject to any disclaimer, the term of this patent is extended or adjusted under 35 U.S.C. 154(b) by 42 days.

(21) Appl. No.: 14/827,424

(22) Filed: Aug. 17, 2015

(65) Prior Publication Data
US 2017/0051854 A1 Feb. 23, 2017

(51) Int. Cl.
F16L 21/04 (2006.01)
F16L 21/02 (2006.01)

(52) U.S. Cl.
CPC ............. F16L 21/04 (2013.01); F16L 21/022 (2013.01)

(58) Field of Classification Search
CPC ........ F16L 21/007; F16L 21/06; F16L 21/065
USPC ........................................ 285/373, 419, 367
See application file for complete search history.

(56) References Cited

U.S. PATENT DOCUMENTS

| | | |
|---|---|---|
| 293,734 A | 2/1884 | Harrison |
| 1,510,394 A * | 9/1924 | Frazier .................. F16L 55/172 |
| | | 285/373 |
| 2,269,664 A | 1/1942 | Hallerberg |
| 2,491,004 A | 12/1949 | Graham |
| 2,541,205 A | 2/1951 | Christophersen |
| 2,741,497 A | 4/1956 | Risley |
| 2,937,037 A | 5/1960 | Woolsey |
| 2,985,291 A | 5/1961 | Schoepe et al. |
| 3,029,946 A | 4/1962 | Wright, Jr. et al. |
| 3,124,367 A | 3/1964 | Kaynor |
| 3,233,907 A | 2/1966 | Stanton |
| 3,315,970 A | 4/1967 | Holloway |
| 3,432,189 A | 3/1969 | Buller |
| 3,485,515 A | 12/1969 | Frishof |
| 3,486,772 A | 12/1969 | Elsner |
| 3,661,409 A * | 5/1972 | Brown .................... F16L 23/10 |
| | | 285/367 |
| 3,680,894 A | 8/1972 | Young |

(Continued)

OTHER PUBLICATIONS

STRAUB; www.straub-couplings.com, as viewed on Aug. 17, 2015 (2 pages).

Primary Examiner — David E Bochna
(74) Attorney, Agent, or Firm — Wood Herron & Evans LLP (57) ABSTRACT

A pipe coupling for coupling adjacent pipe ends of a pair of pipes includes a sleeve, a sealing gasket operatively coupled with the sleeve adjacent an open end of the sleeve, and a clamping element for compressing the sleeve or the sealing gasket into tightened engagement with one of the pipe ends. The clamping element includes two bolt flanges nominally spaced apart by a gap and a double threaded fastening bolt with two external threaded portions, which engage with two corresponding fastening nuts having right-hand thread and left-hand thread, respectively. Accordingly, when the fastening bolt is rotated, both of the fastening nuts move towards or away from one another, thereby rapidly moving the bolt flanges to shrink the gap and compress the clamping element or to expand the gap. As such, less time and labor are required to operate the pipe coupling in the field.

11 Claims, 9 Drawing Sheets

(56) References Cited

U.S. PATENT DOCUMENTS

| | | |
|---|---|---|
| 3,724,878 A | 4/1973 | Ford |
| 3,727,951 A | 4/1973 | Shire et al. |
| 3,877,733 A | 4/1975 | Straub |
| 4,163,571 A | 8/1979 | Nash |
| 4,225,160 A * | 9/1980 | Ortloff ............... F16L 23/08 |
| | | 285/367 |
| 4,362,323 A | 12/1982 | Lodder et al. |
| 4,421,347 A | 12/1983 | Kantor |
| 4,471,979 A | 9/1984 | Gibb et al. |
| 4,480,860 A | 11/1984 | Foresta et al. |
| 4,486,037 A * | 12/1984 | Shotbolt ............. F16L 27/053 |
| | | 285/367 |
| 4,538,841 A | 9/1985 | Royston |
| 4,606,565 A | 8/1986 | Royston |
| 4,824,148 A | 4/1989 | Grabowski |
| 5,069,490 A | 12/1991 | Halen, Jr. |
| 5,203,594 A | 4/1993 | Straub |
| 5,257,834 A | 11/1993 | Zeidler et al. |
| 5,314,213 A | 5/1994 | Heister et al. |
| 5,476,292 A | 12/1995 | Harper |
| 5,560,656 A | 10/1996 | Okamura et al. |
| 5,941,576 A | 8/1999 | Krausz |
| 6,168,210 B1 | 1/2001 | Bird |
| 6,293,556 B1 | 9/2001 | Krausz |
| 6,499,773 B1 * | 12/2002 | Ostergaard ............. F16L 23/08 |
| | | 285/367 |
| 7,243,955 B2 | 7/2007 | Krausz et al. |
| 7,384,076 B2 * | 6/2008 | Bradley ................ F16L 21/08 |
| | | 285/373 |
| 7,571,940 B2 | 8/2009 | Krausz et al. |
| 7,625,018 B2 | 12/2009 | Krausz et al. |
| 7,654,586 B2 | 2/2010 | Krausz et al. |
| 7,891,713 B2 * | 2/2011 | Bekkevold ............... F16L 1/26 |
| | | 285/406 |
| 7,997,626 B2 * | 8/2011 | Krausz ................. F16L 21/022 |
| | | 285/369 |
| 8,020,898 B2 | 9/2011 | Ignaczak |
| 8,448,993 B2 * | 5/2013 | Cumic ................. F16L 21/065 |
| | | 285/420 |
| 8,528,945 B2 * | 9/2013 | Bird ....................... F16L 21/04 |
| | | 285/369 |
| 8,864,181 B2 * | 10/2014 | Bird ..................... F16L 21/022 |
| | | 285/369 |
| 2007/0024056 A1 | 2/2007 | Borland |

* cited by examiner

FIG. 10

PIPE COUPLING HAVING DOUBLE-THREADED TIGHTENING FASTENER AND ASSOCIATED METHODS

TECHNICAL FIELD

The present invention relates to pipe couplings adapted to couple and seal adjacent pipe ends of two pipe sections of the same or different diameters, thereby to form a fluid communication joint between the pipe ends.

BACKGROUND

Generally speaking, various types of conventional pipe couplings for coupling and sealing adjacent pipe ends of two pipe sections include a coupling sleeve or collar with each pipe end extending into a respective end of the coupling sleeve. A gasket is held adjacent each end of the sleeve overlying the pipe section, or alternatively, along the length of the sleeve. To secure the pipe ends in place, at least one of the sleeve and the gasket(s) must be compressed onto the pipe ends to form a tightened or sealing engagement. The various types of pipe couplings available today include different types of clamping elements or mechanisms for producing this selective compression on the sleeve and/or the gasket(s).

In one example, a pipe coupling is shown in U.S. Pat. No. 6,168,210 and utilizes continuous flanges (also referred to as "glands") that are coupled together via bolts spanning a longitudinal length of the sleeve. As described in that reference, the flanges, sleeve ends, and gaskets have particular relationships that affect the seal and allow the coupling to work over a range of pipe sizes to compress the gaskets against the pipe ends as the flanges are drawn towards each other using the bolts.

In another example, a pipe coupling is shown in U.S. Pat. No. 8,528,945 and utilizes split-ring glands that each encircle one of the sleeve ends and the gasket(s) adjacent that sleeve end. As described in that reference, the encirclement of the sleeve end and the gasket(s) is complete except at a gap formed between spaced ends of two gland members defining the split-ring gland. Instead of requiring bolts that span the longitudinal length of the sleeve, each split-ring gland can be tightened independently by using a bolt to draw together bolt flanges located on the spaced ends of the split-ring gland. Once again, the gasket(s) and split-ring glands are designed to enable a wide range of clamping force adjustment and gap size so as to engage with various sizes of pipe ends at the sleeve.

Yet another example of a pipe coupling is commercially referred to as a Straub® pipe coupling, some of which are manufactured by Swiss company Straub Werke AG and distributed by companies such as Performance Coupling Company of National City, Calif. As can be seen in product manuals on their website straub-couplings.com, at least an outermost portion of the sleeve of this type of pipe coupling may be split to define a gap that extends along the longitudinal length thereof. Thus, once the pipe ends are inserted into the opposing ends of the sleeve, this outermost portion or clamping elements secured to the outermost portion compress the gap by tightening a series of bolts extending across the gap between corresponding pairs of bolt flanges. Other types of pipe couplings are also known, many of these being secured together and adjusted in compression with some type of threaded fastener and bolt arrangement, just as in the three specific examples described above.

Consequently, many of the pipe couplings used in the field today are installed and adjusted using threaded bolts and nuts. Typically a socket wrench or some sort of similar tool must be used to rotate the bolts to perform the installation process. However, many pipe couplings are provided with a wide range of adjustable compression that may be applied, and so the bolts may need to be moved a significant length or distance during the tightening of the pipe coupling onto the pipe ends. In addition to requiring more time and manual labor for longer movements, specialty socket wrenches must sometimes be provided to handle the long length of movement from the starting or nominal (uncompressed) position to the fully compressed and sealed engagement position. The added complexity of parts and tools for the job may be undesirable when working in the field, such as when an installer is working in dark or poor environmental conditions on a buried pipe connection.

As such, it would be desirable to further improve the various types of conventional pipe couplings to minimize the number of separate or loose parts and tools that an installer must work with when connecting two pipe ends using the pipe coupling. Furthermore, it would also be desirable to reduce the time and manual labor required to install these pipe couplings, thereby making the users more efficient overall.

SUMMARY

In accordance with one embodiment of the invention, a pipe coupling is provided for sealingly coupling two pipe ends together. The pipe coupling includes a sleeve, a sealing gasket operatively coupled with the sleeve, and a clamping element operatively coupled with the sleeve. The sleeve has a generally cylindrical body portion with open opposing ends that receive the two pipe ends, and the sealing gasket engages at least one of the two pipe ends. The clamping element is used to compress the sealing gasket into tightened engagement with at least one of the two pipe ends. For example, if each clamping element produces tightened engagement with only one of the pipe ends, a second clamping element will be provided to produce tightened engagement with the other of the pipe ends, thereby completing a sealed joint with fluid communication between the two pipe ends. The clamping element includes first and second bolt flanges which are nominally spaced from one another to define a gap between them, a double threaded fastening bolt extending generally tangential to the generally cylindrical body portion and through the bolt flanges, and first and second fastening nuts in threaded engagement with the fastening bolt. More specifically, the fastening bolt includes first and second external threaded portions connected at a central bolt portion, and these external threaded portions and the fastening nuts define corresponding right-hand thread and left-hand thread. Thus, as the fastening bolt is rotated, both of the fastening nuts move along the external threaded portions towards or away from one another and the central bolt portion, thereby reducing the labor and time required for installing the pipe coupling.

In one aspect of this embodiment, at least one of the bolt flanges and the fastening nuts include corresponding features that prevent rotation of the fastening nuts relative to the bolt flanges when the fastening nuts are in abutting engagement with the bolt flanges. In one particular example, each of the bolt flanges defines a socket with an arcuate surface, and each of the fastening nuts includes an arcuate surface that is positioned in face-to-face contact with the arcuate surface within the socket. This face-to-face contact of the arcuate surfaces prevents rotation of the fastening nuts relative to the bolt flanges. As such, rotation of the fastening bolt causes lengthwise movement of the fastening nuts and the bolt flanges along the fastening bolt. The fastening nuts are swivel nuts with a semicircular prism shape and threaded bores, in this example.

In another aspect consistent with this embodiment of the pipe coupling, the clamping element includes no washers used in conjunction with the bolt flanges and the fastening nuts. In this regard, the clamping element consists only of two fastening nuts, the fastening bolt, and the elements carrying the first and second bolt flanges. Accordingly, a reduced or minimized number of parts needs to be accounted for and worked with when installing the pipe coupling onto the pipe ends.

In order to enable assembly of the clamping element as described above, the fastening bolt may further include a removable head portion that is coupled with one of the first and second external threaded portions. The removable head portion is secured in position on this external threaded portion after the fastening bolt is engaged with the same external threaded portion, which thereafter enables the fastening bolt to be engaged by a driver such as a socket wrench for rotating the bolt. The removable head portion may be in threaded engagement with the external threaded portion, in one example, although it will be understood that some additional form of positive lock or securing may also be required to prevent the head portion from simply rotating off the remainder of the fastening bolt when the pipe coupling is in use, particularly when the fastening bolt is configured to be re-used.

The first and second fastening nuts, in some embodiments, define an outer peripheral surface and chamfered openings at an intersection of the outer peripheral surface and the threaded bores extending through the fastening nuts. The chamfered openings help guide the fastening bolt into the threaded engagement with the threaded bore, which is particularly useful when an installer does not have good visibility when installing or adjusting the pipe coupling in the field. The fastening nuts and the fastening bolt are typically formed from stainless steel for providing the desired amount of strength, cost-efficiency, and durability under the loads typically placed on the pipe coupling.

This embodiment of the pipe coupling may be used with several types of specific clamping elements. In one example, the clamping element includes a U-shaped gland that engages and at least partially surrounds a flange on one open opposing end of the sleeve and an adjacent sealing gasket as well. The U-shaped gland therefore surrounds one of the two pipe ends also. The gland includes spaced ends including the first and second bolt flanges, such that the spaced ends can be drawn together to compress the gland and the annular gasket onto the pipe end. The U-shaped gland may more particularly include a split-ring gland with two partially circular gland members defining abutting ends at one side and the spaced ends on the other side. An armor may be inserted to span the gap between the spaced ends, thereby forming a generally closed annular periphery with the gland members for the sealing gasket. In another example, the clamping element includes first and second elongated bolt flange members secured with the sleeve and defining the first and second bolt flanges, respectively. The first and second bolt flanges in this example include a plurality of bores aligned along a longitudinal length of the sleeve, such that a plurality of double threaded fastening bolts are received in these bores. The fastening bolts are tightened to compress the sleeve at multiple locations onto the pipe ends. The sleeve of this example may include an elongated split-ring cylinder with spaced ends carrying the first and second elongated bolt flange members, such that tightening of the fastening bolts shrinks the gap of the split-ring cylinder. Regardless of the particular clamping element used with the pipe coupling, the time and manual labor required to install the pipe coupling is significantly reduced by using the double threaded fastening bolts as described above.

The operation of the pipe coupling described above defines a method of connecting pipe ends together, in accordance with another embodiment of the invention. The method includes positioning the sealing gasket adjacent one of the open opposing ends of the sleeve and inserting a pipe end into the open opposing end of the sleeve such that the sealing gasket and a portion of the sleeve surrounds the pipe end. The clamping element is engaged with the open opposing end of the sleeve and the sealing gasket such that the clamping element is operatively coupled with the sleeve. First and second bolt flanges on the clamping element are nominally spaced from one another by a gap when these elements are operatively coupled as described. The fastening bolt is inserted to extend through the first and second bolt flanges, with the first and second fastening nuts threadably engaged with the first and second external threaded portions of the fastening bolt. The fastening nuts are specifically positioned to abut the corresponding first and second bolt flanges. The method then includes rotating the fastening bolt in a first direction to cause the first and second fastening nuts to move along the external threaded portions towards one another, thereby drawing the bolt flanges towards one another to shrink the gap therebetween and compress the sealing gasket and the sleeve into tighter engagement with the pipe end. The rotation of the fastening bolt advantageously results in twice as much movement of the bolt flanges towards one another compared to fastening bolts engaged with only a single fastening nut.

When the pipe end is later to be removed from the pipe coupling, the method further includes rotating the fastening bolt in a second direction opposite the first direction. This rotation in the second direction causes the first and second fastening nuts to move along the external threaded portions away from one another, thereby allowing the bolt flanges to move away from one another and expand the gap therebetween. This movement releases the compressive engagement of the sealing gasket and the sleeve with the pipe end. The pipe end is then withdrawn from the open opposing end of the sleeve and from the clamping element.

In one aspect, the bolt flanges and/or the fastening nuts include corresponding features configured to prevent relative rotation. When the fastening nuts are moved into abutting engagement with the bolt flanges, these corresponding features are engaged. As a result, the method also includes preventing relative rotation of the fastening nuts and the bolt flanges with the corresponding features during rotation of the fastening bolt. In a further example, engaging the corresponding features includes inserting the fastening nuts into sockets provided in the bolt flanges. The fastening nuts and the sockets in the bolt flanges further include arcuate surfaces that are brought into face-to-face contact to define the abutting engagement in some embodiments.

In another aspect, a removable head portion is threadably engaged with the fastening bolt after the fastening bolt is inserted to extend through the bolt flanges with the fastening nuts in position. The removable head portion is configured to engage with a driver such as a socket wrench when rotating the fastening bolt.

One alternative type of embodiment of a pipe coupling for sealingly coupling two pipe ends together is also provided. The pipe coupling of this embodiment again includes a sleeve with open opposing ends, a sealing gasket, and a clamping element. The clamping element is modified to include first and second clamp members operatively coupled with the open opposing ends of the sleeve and the sealing gasket. The first and second clamp members include respective first and second bolt flanges. The double threaded fastening bolt is again used, but this time the fastening bolt extends generally parallel to a longitudinal length of the cylindrical body portion of the sleeve so as to also extend through the first and second bolt flanges. The clamping element again includes first and second fastening nuts with right-hand thread and left-hand thread configured to engage with corresponding external threaded portions on the fastening bolt. When the fastening bolt of this embodiment is rotated, the first and second bolt flanges and the first and second clamp members are drawn towards one another, which causes compression of the sealing gasket and/or the sleeve to create a tightened engagement with the pipe ends. Also like the previously described embodiment, the bolt flanges and clamp members favorably move towards or away from one another twice as fast (or with half as much bolt rotation) as conventional designs.

The various features of the embodiments described above may be combined in any configuration as desired. Various additional features and advantages of the invention will become more apparent upon review of the following detailed description of the illustrative embodiments taken in conjunction with the accompanying drawings.

DETAILED DESCRIPTION

Figure 1:
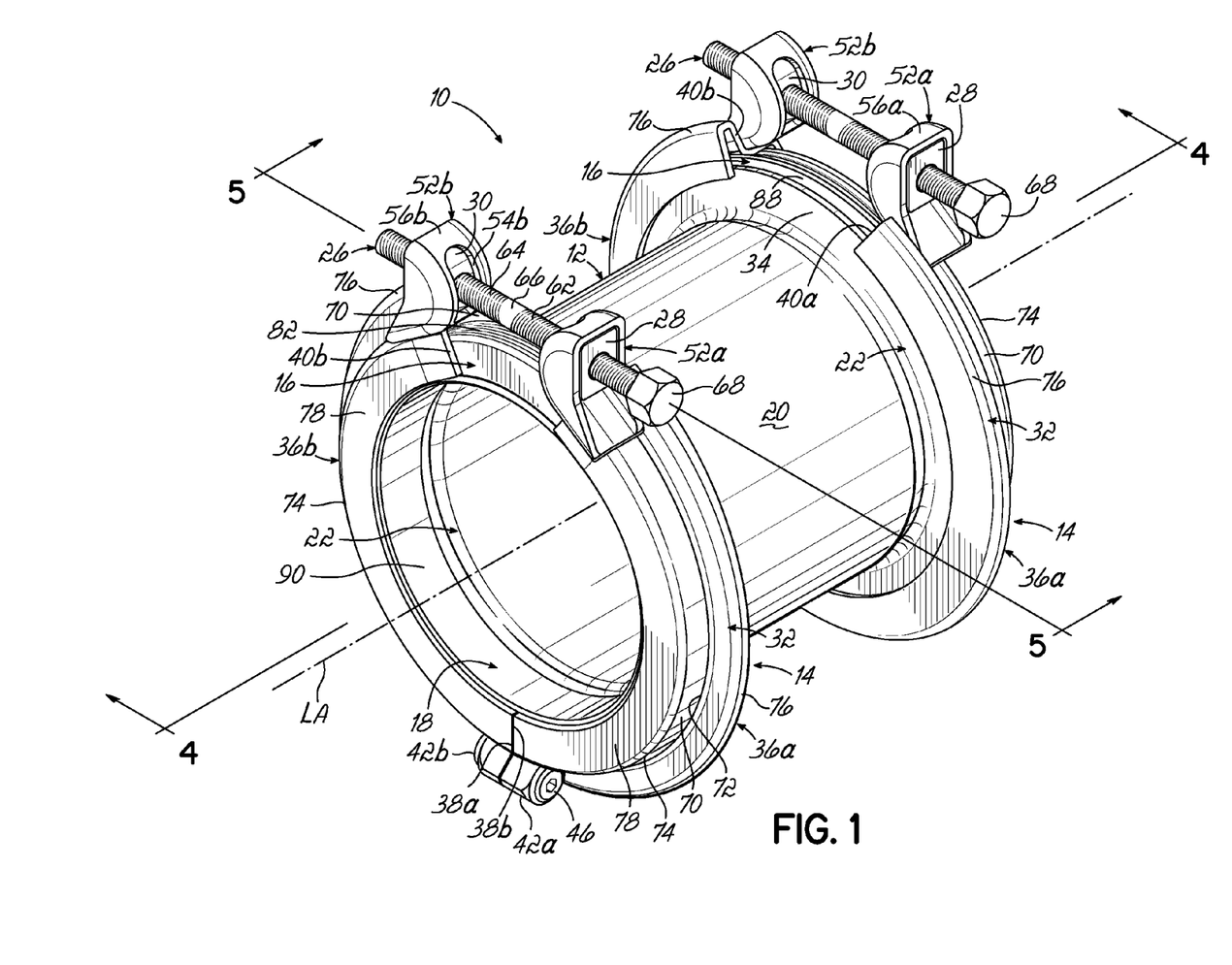
FIG. 1 is a perspective view of a first embodiment of a pipe coupling utilizing a clamping element with a double threaded fastening bolt, in accordance with the principles of the described invention, and in a fully assembled state.
Figure 2:
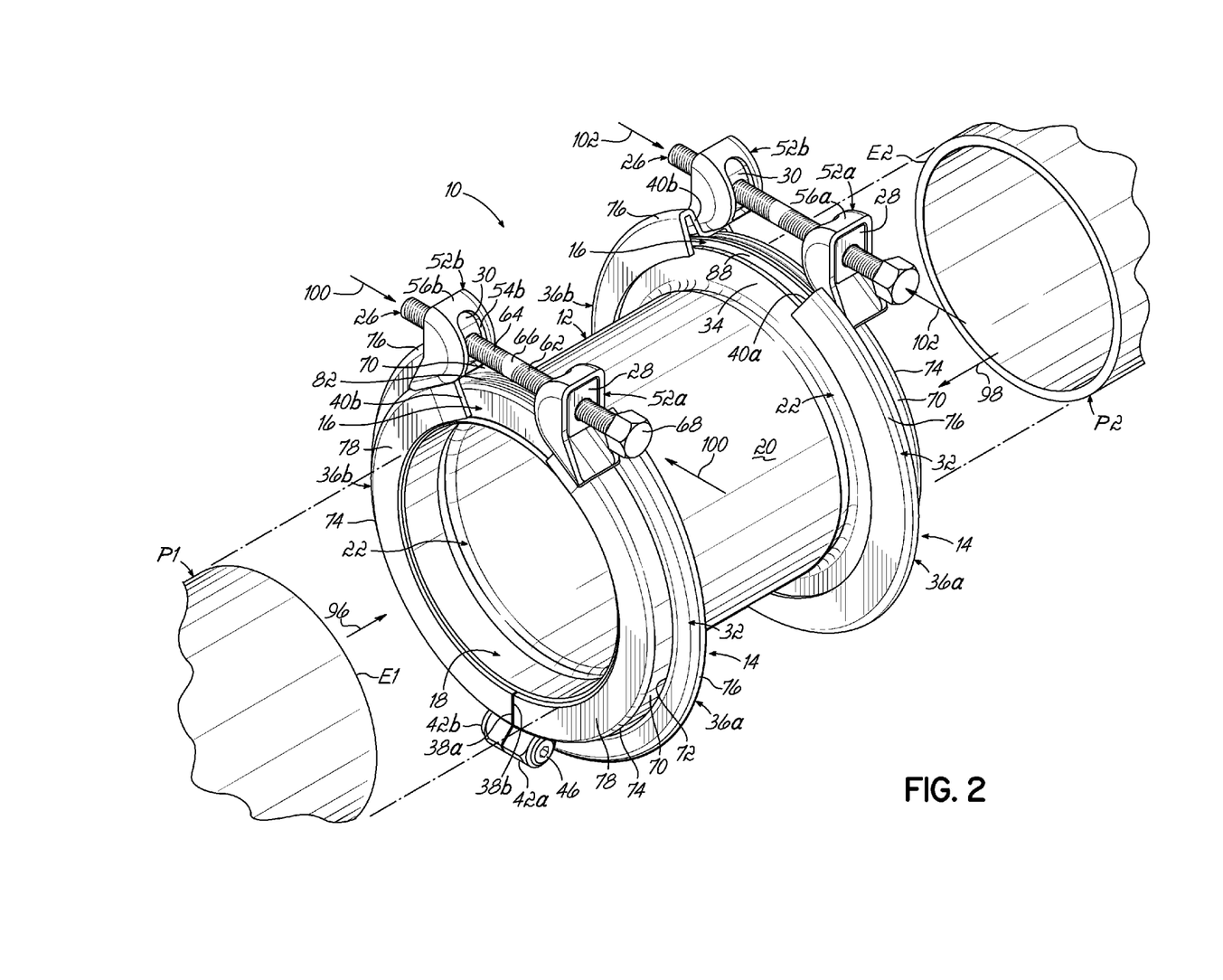
FIG. 2 is a perspective view of the pipe coupling of FIG. 1, with pipe ends of two pipes added in the illustration for purposes of describing the use of the pipe coupling to couple the two pipes in fluid communication and sealed engagement.
Figure 3:
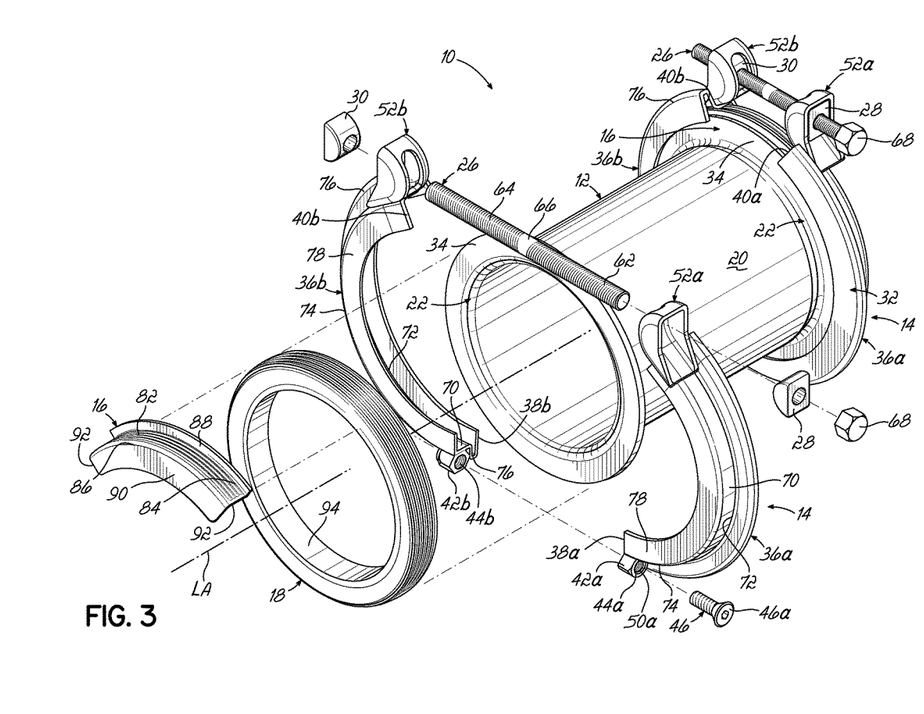
FIG. 3 is partially-exploded perspective view of the pipe coupling of FIG. 1, illustrating the various components of a clamping element used with this embodiment.

In FIGS. 1 through 7, a pipe coupling 10 according to one embodiment of the present invention is shown. The pipe coupling 10 of this embodiment is typically referred to as a split-ring gland type of pipe coupling. With particular reference to FIGS. 1 through 3, the pipe coupling 10 includes a sleeve 12, a pair of split-ring glands 14 (defining a substantially U-shaped gland), an armor 16 associated with each split-ring gland 14, and an annular sealing gasket 18 associated with each split-ring gland 14. More specifically, the sleeve 12 includes a generally cylindrical body portion 20 with opposing open ends 22, with each of the open ends 22 being operatively coupled with one of the split-ring glands 14, one armor 16, and one annular sealing gasket 18. As a result, in the fully assembled state of the pipe coupling 10, a pipe end E1 of a first pipe P1 is inserted into the sleeve 12 through one of the split-ring glands 14 and the corresponding sealing gasket 18, and a pipe end E2 of a second pipe P2 is inserted into the other split-ring gland 14 and associated gasket 18. Each of the split-ring glands 14 defines part of a clamping element 24 which is used to compress the corresponding sealing gasket 18 into a tightened sealed engagement with the corresponding pipe end E1, E2. Advantageously, the clamping element 24 of this embodiment uses a double threaded fastening bolt 26 engaged with first and second fastening nuts 28, 30 to simplify the assembly of parts needed to form the tightened engagement of the pipe coupling 10 on the first and second pipes P1, P2. In this regard, and as described below, the clamping element 24 enables connection of the pipes P1, P2 with the pipe coupling using less time and manual labor than conventional pipe coupling designs. Various aspects have been omitted for improved clarity, these aspects are fully shown and described in U.S. Pat. Nos. 6,168,210 and 8,528,945, both of which are incorporated herein by reference.

In the fully assembled state of the pipe coupling 10, the split-ring glands 14 are configured to be tightened onto the corresponding sealing gaskets 18 to compress the sealing gaskets 18 into sealing connection with the respective pipe ends E1, E2. The split-ring gland 14 and the armor 16 collectively define a generally closed annular periphery 32 around the sealing gasket 18, which further ensures that fluid passing through the pipes P1, P2 and the pipe coupling 10 does not leak past the sealing gasket 18 and out of the pipe coupling 10. Thus, the pipe coupling 10 provides a sealed coupling of two adjacent pipe ends E1, E2 in fluid communication.

Further details of the components of the pipe coupling 10 are shown in FIG. 3, in which one of the split-ring glands 14 is shown partially exploded to facilitate discussion. The generally cylindrical body portion 20 of sleeve 12 defines a longitudinal axis LA of the pipe coupling 10. At each of the opposing ends 22, the sleeve 12 further includes a radially outwardly-directed flange 34 that is used to accurately locate the split-ring gland 14 and the annular sealing gasket 18, as described in further detail below. Although the sleeve 12 of the exemplary embodiment is shown as cylindrical, it will be understood that the body portion 20 of the sleeve 12 may also be tapered slightly inwardly adjacent both open ends 22 to provide clearance for slight angles between the pipe ends E1, E2 to be coupled in fluid communication by the pipe coupling 10.

Each of the split-ring glands 14 shown in FIGS. 1 through 3 includes a first partially-circular gland member 36a and a second partially-circular gland member 36b. The gland members 36a, 36b each define a half-moon shape and are configured to be centered about the longitudinal axis LA of the pipe coupling 10. The gland members 36a, 36b define respective abutting ends 38a, 38b at one side and respective spaced ends 40a, 40b on the other side, each of which is discussed in turn below.

The abutting ends 38a, 38b are configured to be securely coupled together in generally gap-free relationship as shown in FIGS. 1 and 2. To this end, the abutting end 38a of the first gland member 36a includes a first abutting bolt flange 42a projecting radially outwardly from the abutting end 38a. Similarly, the abutting end 38b of the second gland member 36b includes a second abutting bolt flange 42b projecting radially outwardly from the abutting end 38b.

The first and second abutting bolt flanges 42a, 42b include corresponding apertures 44a, 44b (shown in FIG. 3) oriented tangential to the axis LA and configured to receive a fastener, for example, the threaded bolt 46. The bolt 46 extends through the apertures 44a, 44b, such that the bolt 46 is also oriented generally tangential to the split-ring gland 14 in the illustrated embodiment of the pipe coupling 10. Each of the apertures 44a, 44b is threaded in the illustrated embodiment for engaging with threads on the bolt 46, but it will be understood that these apertures 44a, 44b may be modified in other embodiments so that only one (e.g., a threaded bore only at 44b) or none of these includes threading (in which case, a nut would be used to tighten the bolt 46 in position within the apertures 44a, 44b). Consequently, when the bolt 46 securely couples the abutting ends 38a, 38b, the gland members 36a, 36b are restrained from pivotally rotating relative to each other, such that the ends 40a, 40b are restrained from scissoring apart. The first and second abutting bolt flanges 42a, 42b may be provided with opposing countersinks 50a, 50b (only 50a is shown in FIG. 3) facing away from one another and configured to receive the head 46a of the bolt 46 generally flush with the structure of the first and second abutting bolt flanges 42a, 42b. However, the first and second abutting bolt flanges 42a, 42b may be securely coupled by alternative fasteners as alluded to above.

Now considering the spaced ends 40a, 40b, the first and second gland members 36a, 36b respectively include first and second spaced bolt flanges 52a, 52b. The first and second spaced bolt flanges 52a, 52b project radially outwardly from the spaced ends 40a, 40b of the first and second gland members 36a, 36b. The spaced bolt flanges 52a, 52b include corresponding apertures 54a, 54b (only 54b is shown in FIG. 2) configured to receive the double threaded fastening bolt 26 therethrough. Each of the spaced bolt flanges 52a, 52b may define a socket with a convex arcuate surface 56a, 56b between the spaced ends 40a, 40b and a concave arcuate surface 58a, 58b (shown in FIG. 5). The first and second fastening nuts 28, 30 include convex arcuate surfaces 60a, 60b configured to be received by the concave arcuate surfaces 58a, 58b of the first and second spaced bolt flanges 52a, 52b.

Figure 5:
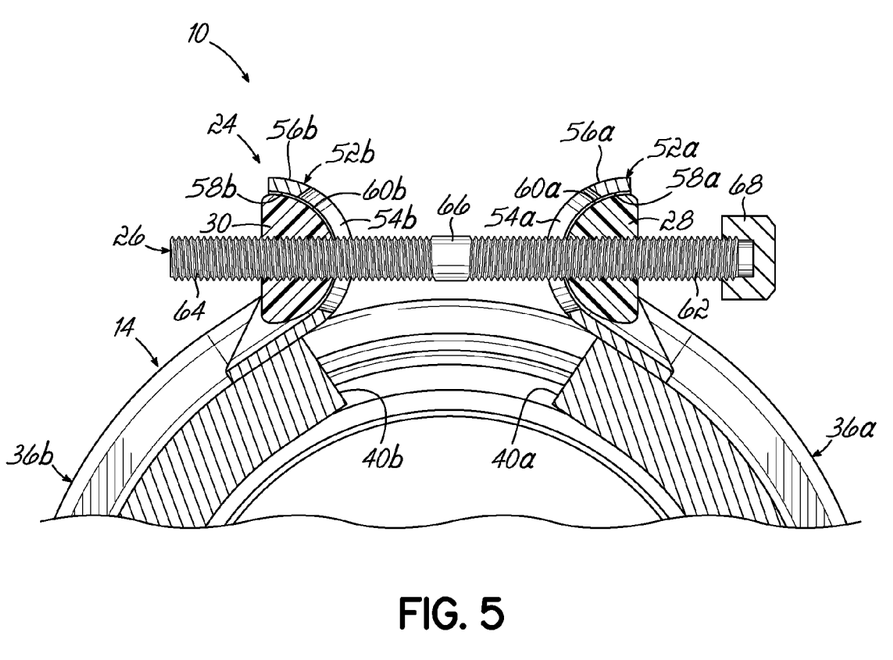
FIG. 5 is a lateral cross-sectional view of one end of the pipe coupling of FIG. 1, taken specifically along line 5-5 in FIG. 1 so as to show the features of the clamping element, including the fastening bolt, two fastening nuts, and two bolt flanges.

As shown in FIG. 3, the first and second fastening nuts 28, 30 are swivel nuts with a semicircular prism shape and threaded bores, however, other fastening nuts 28, 30 may also be suitable. As shown in FIG. 5, the convex arcuate surfaces 60a, 60b of the first and second fastening nuts 28, 30 enable face-to-face contact with the concave arcuate surfaces 58a, 58b of the first and second spaced bolt flanges 52a, 52b within the socket. This face-to-face contact of the arcuate surfaces prevents rotation of the first and second fastening nuts 28, 30 relative to the first and second spaced bolt flanges 52a, 52b. The convex arcuate surfaces 60a, 60b of fastening nuts 28, 30 provide one suitable example of corresponding features that prevent rotation of the first and second fastening nuts 28, 30 relative to the first and second spaced bolt flanges 52a, 52b when the first and second fastening nuts 28, 30 are in abutting engagement with the first and second spaced bolt flanges 52a, 52b.

A double threaded fastening bolt 26 extends generally tangential to the generally cylindrical body portion 20 of sleeve 12 and extends through first and second spaced bolt flanges 52a, 52b, and into at least a portion of the first and second fastening nuts 28, 30 as shown in FIG. 5. The double threaded fastening bolt 26 includes first and second external threaded portions 62, 64 connected at a central bolt portion 66. As shown, the first external threaded portion 62 and the first fastening nuts 28 are both right-hand threaded, while the second external threaded portion 64 and the second fastening nut 30 are both left-hand threaded. Rotation of the double threaded fastening bolt 26 causes lengthwise movement of the first and second fastening nuts 28, 30 and the first and second spaced bolt flanges 52a, 52b along the double threaded fastening bolt 26. In other words, when the first and second fastening nuts 28, 30 are in abutting engagement with first and second spaced bolt flanges 52a, 52b, this movement also causes movement of first and second spaced bolt flanges 52a, 52b towards one another to compress the sleeve 12 and/or the sealing gasket 18. Specifically, as the double threaded fastening bolt 26 is rotated for tightening of the first and second spaced bolt flanges 52a, 52b, the first fastening nut 28 moves along the first external threaded portion 62 towards the central bolt portion 66, while the second fastening nut 30 moves along the second external threaded portion 64 towards the central bolt portion 66. This serves to tighten the clamping element 24, thus sealing the pipe coupling 10 to the first and second ends E1, E2 of the respective first and second pipes P1, P2. Conversely, to loosen the clamping element 24 of the pipe coupling 10, the first and second fastening nuts 28, 30 are moved away from each other on first and second external threaded portions 62, 64.

Figure 6:
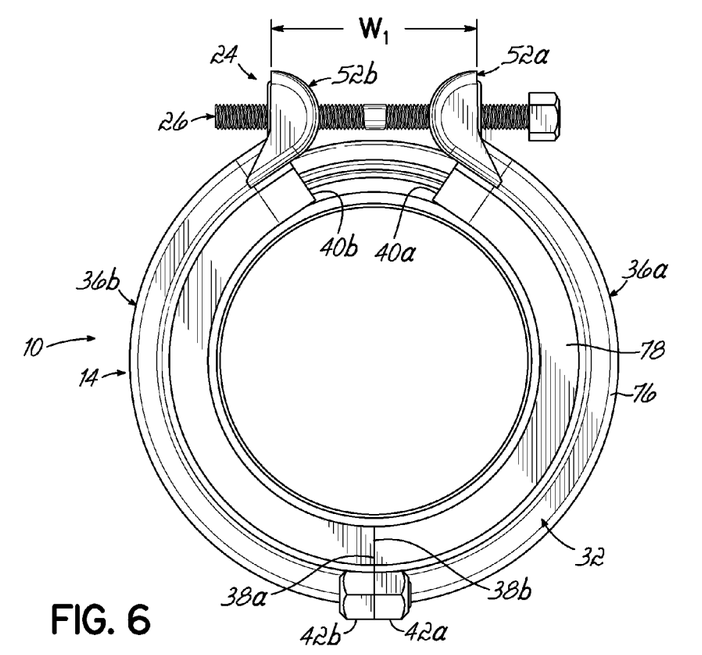
FIG. 6 is an end view of the pipe coupling of FIG. 1 in a first state, wherein the bolt flanges of the clamping element are spaced by a nominal gap and the pipe coupling is not in tightened engagement with the pipe end.
Figure 7:
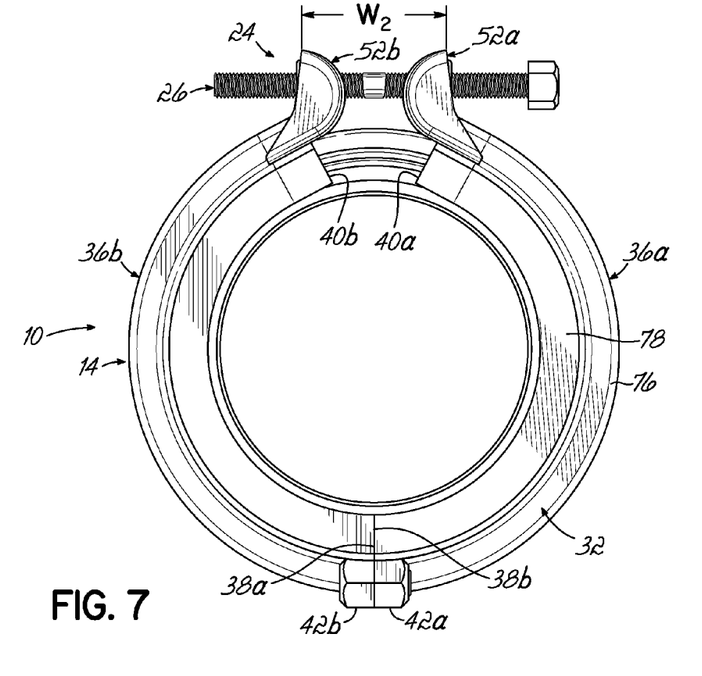
FIG. 7 is an end view of the pipe coupling similar to FIG. 6 but in a second state, wherein the bolt flanges of the clamping element are drawn together to shrink the gap, which causes the pipe coupling to be in tightened engagement with the pipe end.

FIGS. 6 and 7 show the coupling 10 moving between a first state where the clamping element 24 has not yet been tightened and a second state, where the clamping element 24 has been tightened to draw the spaced bolt flanges 52a, 52b and the spaced ends 40a, 40b closer together, to thereby compress the annular sealing gasket 18. In FIGS. 6 and 7, the gap is defined by the distance between the spaced bolt flanges 52a, 52b. In FIG. 6, when the pipe coupling 10 is in a first state, the first and second spaced bolt flanges 52a, 52b of the clamping element 24 are spaced apart by a gap having a first width W1. As shown in FIG. 7, when the pipe coupling is tightened to a second state, the first and second spaced bolt flanges 52a, 52b of the clamping element 24 are drawn together to shrink the gap to a second width W2.

Since the first and second external threaded portions 62, 64 of the double threaded fastening bolt draw both the first and second spaced bolt flanges 52a, 52b together simultaneously, the double threaded fastening bolt 26 only needs to rotate half as much as a conventional fastening bolt with a single nut to achieve the same level of adjustment of clamping element 24. As a result, the labor and time required is reduced for installing the pipe coupling 10. Further, normal socket wrench tools can be advantageously used during the installation and assembly.

In order to enable assembly of the clamping element 24 as described above, the double threaded fastening bolt 26 may include a removable head portion 68 that is coupled with one of the first and second external threaded portions 62, 64. The removable head portion 68 may be secured in a suitable position on the external threaded portion 62, 64 after the double threaded fastening bolt 26 is inserted through the first and second spaced bolt flanges 52a, 52b with the fastening nuts 28, 30 in position. As shown in FIG. 5, the removable head portion 68 may be threadably engaged with the double threaded fastening bolt 26. Alternatively, or in addition to being threadably engaged with the double threaded fastening bolt 26, a locking mechanism (not shown) may be provided to prevent the removable head portion 68 from loosening or completely rotating off the double threaded fastening bolt 26.

The first and second fastening nuts 28, 30, may define an outer peripheral surface and chamfered openings at an intersection of the outer peripheral surface and the threaded bores extending through the fastening nuts. The chamfered openings help to guide the fastening bolt into the threaded engagement with the threaded bore, which is particularly useful when an installer does not have good visibility when installing or adjusting the pipe coupling in the field. The first and second fastening nuts 28, 30 and the double threaded fastening bolt 26 will be formed from any suitable material. One such suitable material is stainless steel that provides the desired amount of strength, cost-efficiency, and durability under the loads typically placed on the pipe coupling 10.

The clamping element 24 does not require the use of washers in combination with the first and second abutting bolt flanges 42a, 42b, the first and second spaced bolt flanges 52a, 52b and the first and second fastening nuts 28, 30. In this regard, the clamping element 24 may consist of simply first and second fastening nuts 28, 30, double threaded fastening bolts 26, and the elements carrying the first and second spaced bolt flanges 52a, 52b.

The first and second gland members 36a, 36b each include a partially-cylindrical annular wall 70 with an inner edge 72 and an outer edge 74. The partially-cylindrical annular walls 70 are generally flat rather than concave in cross section. The first and second gland members 36a, 36b each further include an inwardly-directed U-shaped wall 76 at the inner edge 72 of the annular wall 70. The U-shaped walls 76 are configured to receive the flange 34 at the end 22 of the sleeve 12, thereby accurately locating the split-ring gland 14 on the sleeve 12.

The first and second gland members 36a, 36b each also include an outer wall 78 extending inwardly in a radial direction at the outer edge 74. As described in further detail below, at least a portion of the annular sealing gasket 18 is captured between the outer walls 78 and the flange 34 of the sleeve 12. Thus, the annular walls 70, the outer walls 78, and the flange 34 of the sleeve 12 collectively define a gasket seat 80 (shown in FIG. 4) for the split-ring gland 14. In the exemplary embodiment shown, the split-ring gland 14 may be tightened between a minimum diameter of about 10.00 inches±0.13 inches and a maximum diameter of about 10.81 inches±0.25 inches. The sleeve 12 and the split-ring gland 14 are each formed from carbon steel in one embodiment, but these components may alternatively be formed from stainless steel, plastic, or another suitable structural material.

Figure 4:
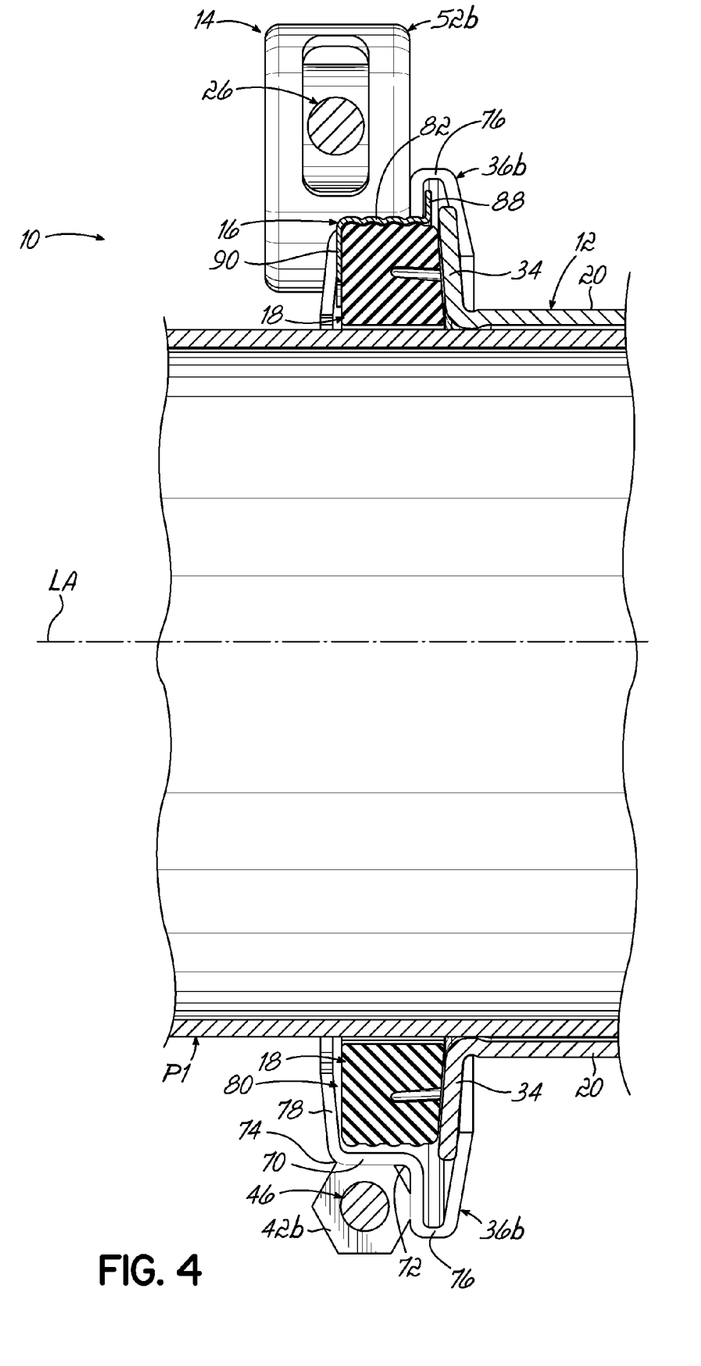
FIG. 4 is a longitudinal cross-sectional view of one end of the pipe coupling of FIG. 1, taken specifically along line 4-4 in FIG. 1 so as to show the engagement of the pipe coupling with one of the pipe ends.

The armor 16 is more clearly shown in FIGS. 3 and 4. The armor 16 may be inserted to span the gap between the spaced ends 40a, 40b, thereby forming a generally closed annular periphery with first and second gland members 36a, 36b for the annular sealing gasket 18. The armor 16 is generally S-shaped in cross section and has an arcuate shape along its length. The armor 16 includes a central wall 82 with an inner side edge 84 and an outer side edge 86. The armor 16 also includes an inner side wall 88 extending generally perpendicular to, and radially inwardly of, the central wall 82 at the inner side edge 84, and an outer side wall 90 extending generally perpendicular to, and radially outwardly of, the central wall 82 at the outer side edge 86. The inner side wall 88 and the outer side wall 90 extend in differing directions from the central wall 82 to form the generally S-shaped cross section of the armor 16. The central wall 82 further includes lateral side edges 92 extending from the inner side edge 84 to the outer side edge 86.

When the armor 16 is positioned at the gap between the spaced ends 40a, 40b of the gland members 36a, 36b, the central wall 82 is positioned adjacent the annular walls 70 of the gland members 36a, 36b at the spaced ends 40a, 40b. To this end, the central wall 82 of the armor 16 defines an arc length that is at least long enough to span the gap such that the lateral side edges 92 of the central wall 82 are disposed underneath the annular walls 70 of the gland members 36a, 36b in the nominal position of the split-ring gland 14. In this position, the inner side wall 88 projects into the U-shaped walls 76 of the gland members 36a, 36b, and the outer side wall 90 is positioned adjacent the outer walls 78 of the gland members 36a, 36b at the spaced ends 40a, 40b. Thus, the armor 16 and the split-ring gland 14 collectively define a closed ring or loop for receiving the annular sealing gasket 18. More specifically, the central wall 82 of the armor 16 cooperates with the annular walls 70 of the gland members 36a, 36b to collectively define the generally closed annular periphery 32 for the annular sealing gasket 18. In the exemplary embodiment, the armor 16 is configured to cover at least about 15% to about 30%, and advantageously, about 20% of the circumference of the sealing gasket 18 when the sealing gasket 18 is installed in the split-ring gland 14.

To assemble the pipe coupling, two split-ring glands 14 are assembled with the armors 16 and the gaskets 18 on the opposing open ends 22 of the sleeve 12. For each of the split-ring glands 14, the two gland members 36a, 36b are brought together such that the U-shaped wall 76 of the split-ring gland 14 is engaged or seated onto the radially directed outward flange 34 at one open end 22 of the sleeve 12. The first and second abutting ends 38a, 38b of the first and second gland members 36a, 36b are securely coupled in a gap free relationship with the bolt 46. Securely coupling the first and second abutting ends 38a, 38b in this manner will provide a gap having a first width W1 between the first and second spaced ends 40a, 40b. The bolt 46 is oriented tangential to the gland members 36a, 36b and therefore restrain the gland members 36a, 36b from scissoring outwardly at the spaced ends 40a, 40b and increasing the length of the gap from the nominal W1. The armor 16 is inserted to span the gap between the spaced ends 40a, 40b of the gland members 36a, 36b and to form a generally closed annular periphery 32 with the gland members 36a, 36b. The annular sealing gasket 18 is inserted into the closed annular periphery 32 of the armor 16 and the first and second gland members 36a, 36b. Alternatively, the armor 16 may be sitting on the sealing gasket 18 and the first and second gland members 36a, 36b may be brought together over the flange 34, the armor 16, and the sealing gasket 18 simultaneously.

The spaced ends 40a, 40b may be coupled by the double threaded fastening bolt 26 and first and second nuts 28, 30. The double threaded fastening bolt 26 and first and second nuts 28, 30 may be loosely engaged to leave the gap at a first width W1, or, alternatively, may be tightened to begin compressing the gasket 18 to leave a gap of a second width W2. The pipe coupling 10 may be packed and shipped in this assembled state in one embodiment. Alternatively, each of the split-ring glands 14 may be assembled with the corresponding armor 16 and sealing gasket 18 as described above without seating the U-shaped wall 76 of the split-ring gland 14 onto the flange 34 of the sleeve 12. In this assembly, the split-ring glands 14 may be shipped separately from the sleeve 12 and may be assembled with the sleeve 12 at a jobsite. The split-ring glands 14 will need to be loosened and mounted on the corresponding flanges 34 of the sleeve 12 at the jobsite in these embodiments. Any of the above-described assembly steps may be undone and repeated as required during installation and/or removal of the pipe coupling 10.

The method includes positioning the sealing gasket 18 adjacent one of the open opposing ends 22 of the sleeve 12 and inserting a pipe end E1, E2 into the open opposing end 22 of the sleeve 12 such that the sealing gasket 18 and a portion of the sleeve 12 surrounds the pipe end E1, E2. Specifically, with reference to FIG. 2, the pipe end E1 of the first pipe P1 is inserted through the gasket opening 94 of a first split-ring gland 14 and through one open end 22 into the sleeve 12 (arrow 96). The pipe end E2 of the second pipe P2 is inserted through the gasket opening 94 of a second split-ring gland 14 and through the other open end 22 into the sleeve 12 (arrow 98). The clamping element 24 is engaged with the open opposing end 22 of the sleeve 12 and the sealing gasket 18 such that the clamping element 24 is operatively coupled with the sleeve 12. First and second spaced bolt flanges 52a, 52b on the clamping element 24 are nominally spaced from one another by a gap of a first width W1 when these elements are operatively coupled. The double threaded fastening bolt 26 is inserted to extend through the first and second spaced bolt flanges 52a, 52b, with the first and second fastening nuts 28, 30 threadably engaged with the first and second external threaded portions 62, 64 of the double threaded fastening bolt 26. The first and second fastening nuts 28, 30 are specifically positioned to abut the corresponding first and second spaced bolt flanges 52a, 52b.

The fastening bolt is then rotated in a first direction to cause the first and second fastening nuts 28, 30 to move along the first and second external threaded portions 62, 64 towards one another, thereby drawing the first and second spaced bolt flanges 52a, 52b towards one another to shrink the gap therebetween and compress the sealing gasket 18 and the sleeve 12 into tighter engagement with the corresponding pipe end E1, E2. As the double threaded fastening bolt 26 is tightened, the gap is shortened from a first width W1 to a second width W2 (as shown in FIGS. 6 and 7) between the first and second spaced ends 40a, 40b thereof (arrow 100) and thereby generally uniformly compress the corresponding annular sealing gasket 18 into sealed engagement with the first pipe P1. The double threaded fastening bolt 26 and first and second nuts 28, 30 of the second split-ring gland 14 is tightened to shorten the gap to a second width W2 between the spaced ends 40a, 40b thereof (arrow 102) and thereby generally uniformly compress the corresponding annular sealing gasket 18 into sealed engagement with the second pipe P2. Each pipe P1, P2 may be inserted into the sleeve 12 prior to tightening the split-ring glands 14, or one pipe (e.g., P1) may be inserted and tightened into position before the other pipe (e.g., P2) is inserted and tightened into position. The rotation of the double threaded fastening bolt 26 advantageously results in twice as much movement of the bolt flanges towards one another compared to fastening bolts engaged with only a single fastening nut.

When the pipe end E1, E2 is later to be removed from the pipe coupling 10, the method includes rotating the double threaded fastening bolt 26 in a second direction opposite the first direction. This rotation in the second direction causes the first and second fastening nuts 28, 30 to move along the external threaded portions 62, 64 away from one another, thereby allowing the first and second spaced bolt flanges 52a, 52b to move away from one another and expand the gap, possibly from the second width W2 to the first width W1, therebetween. This movement releases the compressive engagement of the sealing gasket 18 and the sleeve 12 with the pipe end E1, E2. The pipe end E1, E2 is then withdrawn from the open opposing end 22 of the sleeve 12 and from the clamping element 24.

Figure 8:
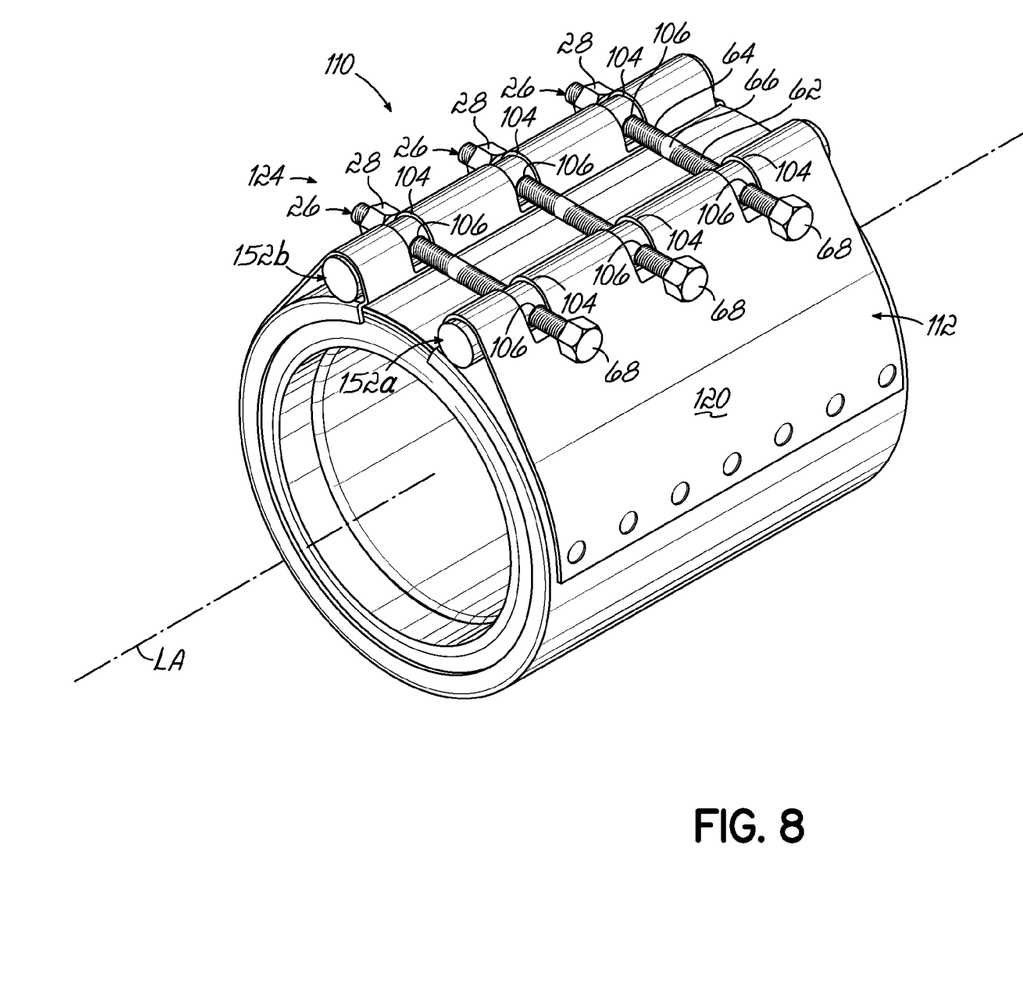
FIG. 8 is a perspective view of a second embodiment of a pipe coupling utilizing a clamping element with a plurality of double threaded fastening bolts, in accordance with the principles of the described invention, and in a fully assembled state.

FIG. 8 illustrates another embodiment of a pipe coupling 110 for sealingly coupling two pipe ends E1, E2 (not shown) together according to the principles of the present invention. It will be understood that many of the components of this pipe coupling 110 are similar to those described above with reference to the first embodiment. This embodiment operates in much the same manner as the first embodiment. Accordingly, the same reference numbers have been used on identical elements appearing in the drawings without further description herein. The pipe coupling 110 of this embodiment is typically referred to as a Straub® pipe coupling. In this embodiment, sleeve 112 includes a body portion 120 that extends along the longitudinal axis LA of the pipe coupling 110. The sleeve 112 has a plurality of spaced slots 104 parallel to the longitudinal axis LA. The first and second spaced bolt flanges 152a, 152b include a plurality of bores 106 aligned along a longitudinal length of the sleeve 112 and drilled generally perpendicular to the longitudinal axis LA, such that a plurality of double threaded fastening bolts 26 is received through spaced slots 104 and into the bores 106, to define a clamping element 124.

As shown in FIG. 8, the first and second spaced bolt flanges 152a, 152b include two parallel rods spaced at a distance from each other. In this embodiment, the first and second spaced bolt flanges 152a, 152b are inserted generally parallel to the longitudinal axis LA, and include a plurality of bores 106. As previously discussed, the double threaded fastening bolt 26 includes first and second external threaded portions 62, 64 connected at a central bolt portion 66. As shown in FIG. 8, three double threaded fastening bolts 26 extend generally tangential to the body portion 120 of sleeve 112. The three double threaded fastening bolts 26 extend through the three bores 106 of the first and second spaced bolt flanges 152a, 152b. Further, the three double threaded fastening bolts 26 are secured by three fastening nuts 28. As the double threaded fastening bolt 26 is tightened, the first and second spaced bolt flanges 152a, 152b move closer to one another as previously described. While three double threaded fastening bolts 26 are shown with three sets of slots 104 and three bores 106 in each of the first and second spaced bolt flanges 152a, 152b, more or fewer double threaded fastening bolts 26 and accompanying slots 104 and bores 106 may be desired.

Figure 9:
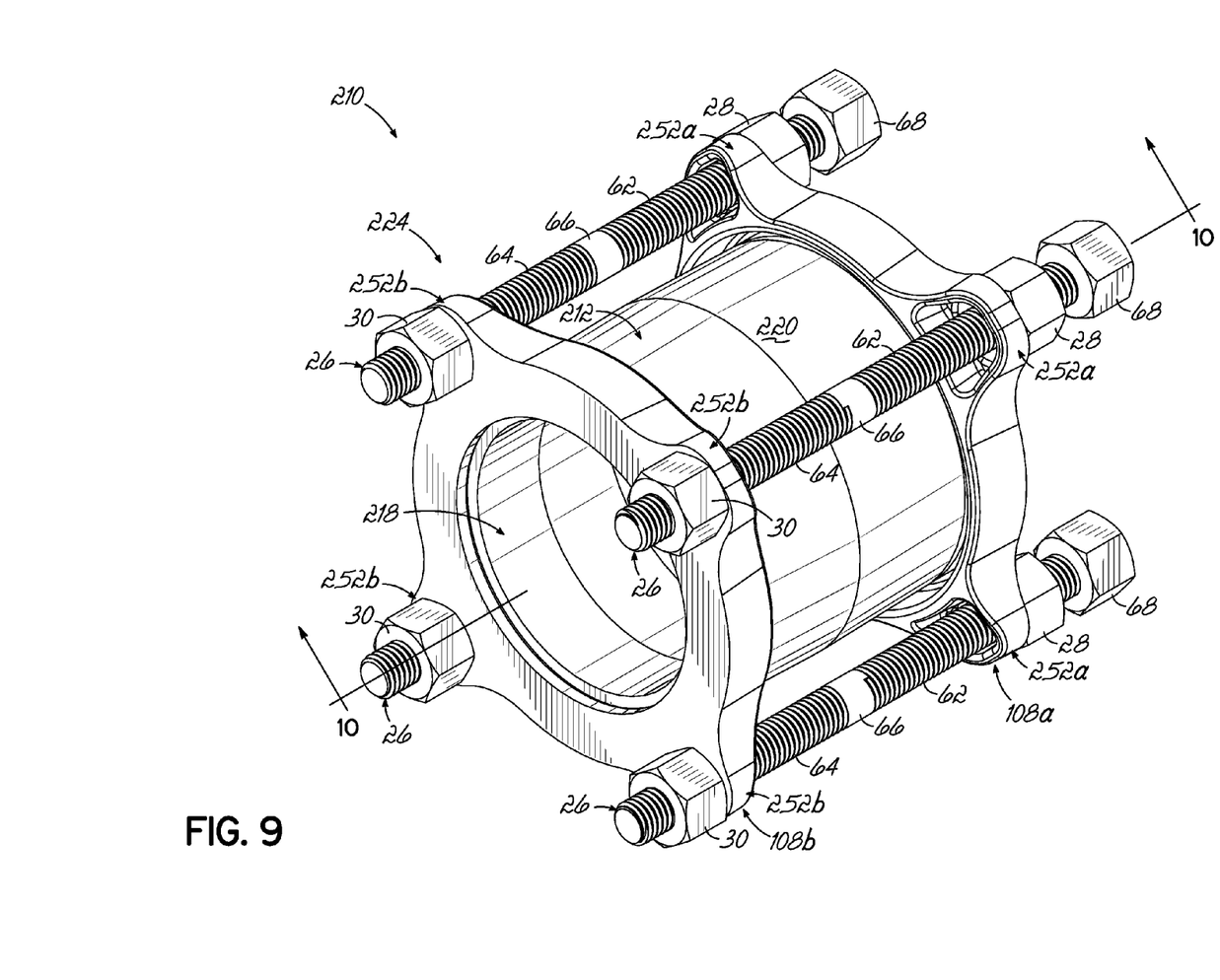
FIG. 9 is a perspective view of a third embodiment of a pipe coupling utilizing a clamping element with a double threaded fastening bolt, in accordance with the principles of the described invention, and in a fully assembled state, with the double threaded fastening bolt extending along the longitudinal length of a sleeve of the pipe coupling.
Figure 10:
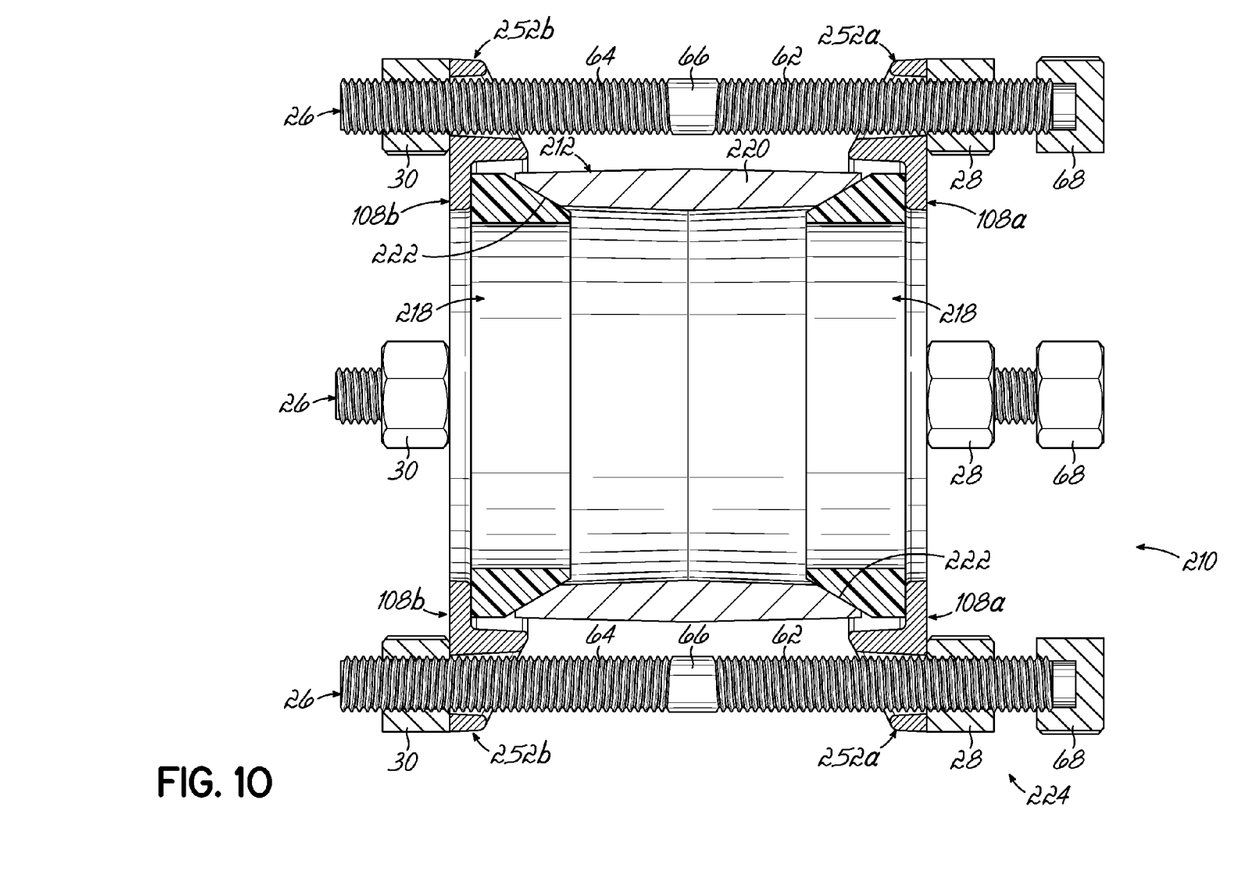
FIG. 10 is a longitudinal cross-sectional view of one end of the pipe coupling of FIG. 9, taken specifically along line 10-10 in FIG. 9 so as to show the engagement of the pipe coupling with one of the pipe ends.

FIGS. 9 and 10 illustrate another embodiment of a pipe coupling for sealingly coupling two pipe ends E1, E2 together according to the principles of the present invention, where multiple double threaded fastening bolts 26 extend along the longitudinal length of a sleeve 212 of the pipe coupling 210. This embodiment operates in a similar manner as the previous embodiments. The clamping element 224 includes first and second clamp members 108a, 108b operatively coupled with the open opposing ends 222 of the sleeve 212 and the sealing gasket 218. The first and second clamp members 108a, 108b include respective first and second spaced bolt flanges 252a, 252b. Double threaded fastening bolts 26 (four shown in FIG. 9 and three shown in FIG. 10) extend generally parallel to the longitudinal length of the cylindrical body portion 220 of the sleeve 212 so as to also extend through the first and second spaced bolt flanges 252a, 252b. The clamping element 224 again includes first and second fastening nuts 28, 30 with right-handed threads and left-handed threads to engage with the corresponding first and second external threaded portions 62, 64 on the double threaded fastening bolt 26. When the double threaded fastening bolts 26 are rotated, and the first and second clamp members 108a, 108b including the first and second spaced bolt flanges 252a, 252b are drawn towards one another, causing the compression of the sealing gasket 218 and/or the sleeve 212. This creates a tightened engagement with the pipe ends E1, E2, as a result of the wedge-shaped configuration of gaskets 218 and sleeve ends 222. To this end, the wedge shape causes inward compression of gaskets 218 into sealed engagement with pipe ends E1, E2 when the fastening bolts 26 are tightened to draw the gaskets 218 longitudinally inwardly towards the sleeve ends 222. Using double threaded fastening bolts 26 advantageously enables the first and second spaced bolt flanges 252a, 252b and first and second clamp members 108a, 108b to move towards or away from one another twice as fast (or with half as much bolt rotation) as conventional designs.

By virtue of the foregoing, there are thus provided an improved pipe coupling in accordance with various aspects of the present invention. While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. Further, while shown as being used to couple two pipe ends E1, E2 via the sleeve 12, only one end E1 or E2 thereof might be provided with the split-ring glands 14, armor 16, and/or sealing gasket 18. The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A pipe coupling for coupling two pipe ends together, comprising:
    a sleeve having a generally cylindrical body portion with open opposing ends configured to receive the two pipe ends;
    a sealing gasket operatively coupled with the sleeve for engaging at least one of the two pipe ends; and
    a clamping element operatively coupled with the sleeve for compressing the sealing gasket into tightened engagement with at least one of the two pipe ends, the clamping element further including:
        first and second bolt flanges nominally spaced from one another to define a gap therebetween,
        a double threaded fastening bolt extending generally tangential to the generally cylindrical body portion of the sleeve and through the first and second bolt flanges, the fastening bolt including first and second external threaded portions connected at a central bolt portion and respectively defining a right-hand thread and a left-hand thread, and
        first and second fastening nuts in threaded engagement with the first and second external threaded portions of the fastening bolt and positioned to abut the respective first and second bolt flanges, the first fastening nut including a threaded bore with a right-hand thread and the second fastening nut including a threaded bore with a left-hand thread,
    wherein each of the first and second bolt flanges includes a socket defining an arcuate surface, and each of the first and second fastening nuts includes an arcuate surface configured to be positioned in face-to-face abutting contact with the arcuate surface of the corresponding first or second bolt flange when inserted into the corresponding socket, to thereby prevent rotation of the first and second fastening nuts relative to the first and second bolt flanges when the first and second fastening nuts are in abutting engagement with the first and second bolt flanges.

2. The pipe coupling of claim 1, wherein each of the first and second fastening nuts defines a convex prism shape defining the arcuate surface which is to be positioned in abutting contact with the first or second bolt flange.

3. The pipe coupling of claim 1, wherein each of the first and second fastening nuts further comprises:
    an outer peripheral surface, and
    chamfered openings at an intersection of the outer peripheral surface and the threaded bore, the chamfered openings configured to guide the fastening bolt into threaded engagement with the threaded bore.

4. The pipe coupling of claim 1, wherein the first and second fastening nuts and the fastening bolt are formed from stainless steel.

5. The pipe coupling of claim 1, wherein the sleeve includes a flange adjacent each of the open opposing ends, the sealing gasket is positioned to abut the flange of the sleeve, and the clamping element further comprises:
    a substantially U-shaped gland engaging and at least partially surrounding the flange of the sleeve and the sealing gasket so as to also surround one of the two pipe ends, the substantially U-shaped gland including spaced ends including the first and second bolt flanges and defining the gap therebetween.

6. The pipe coupling of claim 5, wherein the substantially U-shaped gland further comprises:
    a split-ring gland including two partially-circular gland members with abutting ends securely coupled along one side of the split-ring gland and the spaced ends along another side of the split-ring gland; and
    an armor positioned to span the gap between the spaced ends, the armor and gland members collectively defining a generally closed annular periphery surrounding the sealing gasket.

7. A pipe coupling for coupling two pipe ends together, comprising:

a sleeve having a generally cylindrical body portion with open opposing ends configured to receive the two pipe ends;

a sealing gasket operatively coupled with the sleeve for engaging at least one of the two pipe ends; and a clamping element operatively coupled with the sleeve for compressing the sealing gasket into tightened engagement with at least one of the two pipe ends, the clamping element further including:

first and second bolt flanges nominally spaced from one another to define a gap therebetween, a double threaded fastening bolt extending generally tangential to the generally cylindrical body portion of the sleeve and through the first and second bolt flanges, the fastening bolt including first and second external threaded portions connected at a central bolt portion and respectively defining a right-hand thread and a left-hand thread, and first and second fastening nuts in threaded engagement with the first and second external threaded portions of the fastening bolt and positioned to abut the respective first and second bolt flanges, the first fastening nut including a threaded bore with a right-hand thread and the second fastening nut including a threaded bore with a left-hand thread, wherein the fastening bolt further comprises:

a removable head portion coupled with one of the first and second external threaded portions.

8. A method of connecting pipe ends together with a pipe coupling including a sleeve having a generally cylindrical body portion with open opposing ends, a sealing gasket, and a clamping element including first and second bolt flanges, a double threaded fastening bolt, and first and second fastening nuts, the method comprising:

positioning the sealing gasket adjacent one of the open opposing ends of the sleeve;

inserting a pipe end into the one open opposing end of the sleeve such that the sealing gasket and a portion of the sleeve surrounds the pipe end;

engaging the clamping element with the one open opposing end of the sleeve and the sealing gasket such that the clamping element is operatively coupled with the sleeve, with the first and second bolt flanges nominally spaced from one another by a gap;

inserting the fastening bolt to extend through the first and second bolt flanges in a direction generally orthogonal to the generally cylindrical body portion of the sleeve, with the first and second fastening nuts threadably engaged with first and second external threaded portions of the fastening bolt which define a right-hand thread and a left-hand thread, and with the first and second fastening nuts positioned to abut the first and second bolt flanges; and rotating the fastening bolt in a first direction to cause the first and second fastening nuts to move along the corresponding first and second external threaded portions towards one another, thereby drawing the first and second bolt flanges towards one another to shrink the gap and compress the sealing gasket and the sleeve into tighter engagement with the pipe end, wherein each of the first and second bolt flanges defines a socket with an arcuate surface, each of the first and second fastening nuts includes an arcuate surface, the arcuate surfaces defining corresponding features configured to prevent relative rotation, and the method further comprises:

engaging the corresponding features of the first and second bolt flanges and the first and second fastening nuts, by inserting the first and second fastening nuts into the sockets of the first and second bolt flanges such that the arcuate surfaces of the first and second fastening nuts are brought into abutting engagement with the arcuate surfaces of the first and second bolt flanges, to thereby prevent rotation of the first and second fastening nuts relative to the first and second bolt flanges when the first and second fastening nuts are in abutting engagement with the first and second bolt flanges.

9. The method of claim 8, further comprising the following steps when the pipe end needs to be removed from the pipe coupling:

rotating the fastening bolt in a second direction opposite the first direction to cause the first and second fastening nuts to move along the corresponding first and second external threaded portions away from one another, thereby allowing the first and second bolt flanges to move away from one another to expand the gap and release the compressive engagement of the sealing gasket and the sleeve with the pipe end;

withdrawing the pipe end from the one open opposing end of the sleeve and the clamping element.

10. The method of claim 8, wherein after inserting the fastening bolt to extend through the first and second bolt flanges, the method further comprises:

threadably engaging a removable head portion of the fastening bolt with one of the first and second external threaded portions, the removable head portion configured to engage a driver for rotating the fastening bolt.

11. The method of claim 8, wherein rotating the fastening bolt results in twice as much movement of the first and second bolt flanges towards one another for each rotation of the fastening bolt compared to fastening bolts engaged with only a single fastening nut.

* * * * *